(12) United States Patent
Nakamura et al.

(10) Patent No.: US 7,906,919 B2
(45) Date of Patent: Mar. 15, 2011

(54) ELECTRIC VEHICLE, AND DEVICE AND METHOD OF CONTROLLING SLIP THEREOF

(75) Inventors: Mitsugu Nakamura, Nagoya (JP);
Osamu Nakakita, Sagamihara (JP);
Yoshihide Iwamoto, Sagamihara (JP);
Atsushi Nakao, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 491 days.

(21) Appl. No.: 11/976,613

(22) Filed: Oct. 25, 2007

(65) Prior Publication Data
US 2009/0026984 A1 Jan. 29, 2009

(30) Foreign Application Priority Data
Oct. 26, 2006 (JP) .................................. 2006-290715

(51) Int. Cl.
*B61C 15/08* (2006.01)
(52) U.S. Cl. ............................... 318/52; 318/34; 318/432
(58) Field of Classification Search ..................... 318/52, 318/34, 432
See application file for complete search history.

(56) References Cited

U.S. PATENT DOCUMENTS

| | | | |
|---|---|---|---|
| 5,343,971 A | 9/1994 | Heidelberg et al. | |
| 6,473,683 B1 * | 10/2002 | Nada | 701/82 |
| 6,515,872 B2 * | 2/2003 | Nakayama et al. | 363/17 |
| 6,528,959 B2 | 3/2003 | Kitano et al. | |
| 6,687,589 B2 * | 2/2004 | Kanda | 701/41 |
| 6,954,045 B2 * | 10/2005 | Nishikawa et al. | 318/376 |
| 7,091,678 B2 * | 8/2006 | Hommi et al. | 318/52 |
| 2002/0041167 A1 | 4/2002 | Kitano et al. | |
| 2005/0072608 A1 | 4/2005 | Johnston et al. | |
| 2006/0015236 A1 | 1/2006 | Yamaguchi et al. | |

FOREIGN PATENT DOCUMENTS

| | | |
|---|---|---|
| DE | 40 11 291 A1 | 10/1991 |
| EP | 1 521 146 A2 | 4/2005 |
| JP | 2000-209705 A | 7/2000 |
| JP | 2006-136142 A | 5/2006 |
| JP | 2006-166572 A | 6/2006 |

* cited by examiner

*Primary Examiner* — Bentsu Ro
*Assistant Examiner* — David S Luo
(74) *Attorney, Agent, or Firm* — Birch, Stewart, Kolasch & Birch, LLP

(57) ABSTRACT

A slip control device, a slip control method, and a vehicle provided with such a slip control device are provided, with which the vehicle can travel stably even on a slippery road surface while maintaining good road holding. The device has torque directive control means (23) for calculating torque directives for the motors respectively based on accelerator pedal depressions (24) and steering angles (26) and outputting them to each of motor control sections (21, 22) of the motors, first reference speed calculation means (48) for calculating a first reference speed of one of the pair of left and right motors to be controlled based on rotation speed of the other motor, and restriction applying means (20) for applying restriction to each of the torque directives based on a permissible speed range determined for each of the motors by applying prescribed permissible speed deviation to each of the calculated reference speeds.

16 Claims, 8 Drawing Sheets

(a)

(b)

US 7,906,919 B2

ELECTRIC VEHICLE, AND DEVICE AND METHOD OF CONTROLLING SLIP THEREOF

BACKGROUND OF THE INVENTION

1. Field of the Invention

The present invention relates to a slip control device for suppressing occurrence of slip of driving wheels, a slip control method, and an electric vehicle installed with the control device, the electric vehicle having a pair of right and left wheels driven independently by an electric motor respectively.

2. Description of the Related Art

In a vehicle driven with an engine, right and left driving wheels are connected via a differential and composed such that situations like only the load on the wheel of one side is reduced or slips alone will not happen.

However, in recent years, electric vehicles of light weight and high performance with individual electric motor attached to each driving wheel are prevailing. There is a problem in those electric vehicles that, since the right and left wheel are driven independently, when the load on the wheel of one side decreases or the friction coefficient of the wheel of one side decreases, only the wheel of one side slips or tends to be locked.

A variety of measures has been proposed to deal with the problems. For example, Japanese Laid-Open Patent Application No. 2006-136142 (patent literature 1) discloses an art with which, when traveling condition under which a slip is likely to occur is detected based on the slip ratio calculated from vehicle speed and circumferential speed of wheel, first delay rotation speed obtained by performing first delay processing to the detected rotation speed is used as rotation speed of the induction motor in order to suppress occurrence of slip of the wheel driven by the induction motor.

Japanese Laid-Open Patent Application No. 2000-209705 (patent literature 2) discloses an automatic guided vehicle system for transporting freight, etc. to a destination by automatic driving on a tramway. The vehicle is provided with a master travel device for driving master driving wheels and a slave travel device for driving slave driving wheels. Control is performed such that the torque of the slave drive wheels is suppressed based on the rotation speed difference between the master drive wheels driven under the torque directive from the master travel device and the slave drive wheels driven under the torque directive from the slave travel device.

Further, Japanese Laid-Open Patent Application No. 2006-166572 (patent literature 3) discloses a control device for suppressing slip of an electric vehicle. Control is performed such that a slip is judged according to whether a derivative value of the difference between the circumferential velocity of individual wheel and average of circumferential velocities of all wheels exceeds a reference value of slip or not, and when it is judged that a slip has occurred, driving torque of either the slipping wheel or the mate wheel thereof is reduced.

However, with the method of controlling occurrence of slip according to the patent literature 1, when a slip is detected, the first order frequency is gradually increased by allowing it to pass a first delay filter, so the initial slip can be restricted, but when the slip begins it is difficult to control rotation speed of the wheel once the slip occurs.

With the art disclosed in the patent literature 2, torque control is performed based on the rotation speed difference between the master drive wheels and slave drive wheels. Therefore, it can not be applied to controlling slips of left and right wheels in consideration of difference between rotation speeds of left and right wheels which occur when the vehicle is turned.

With the control device according to the patent literature 3, control is performed by judging occurrence of slip based on a derivative value of difference between the circumferential velocity of individual wheel and average of circumferential velocities of all wheels, the initial slip can be properly judged and restricted. However it is difficult to control rotation speed of the wheel once the slip occurs.

As mentioned above, there are problems in an electric vehicle with motors attached to wheels individually that only the wheel of one side slips or tends to be locked. There have been proposed a variety of slip suppressing control devices for electric vehicles with individual motors for driving each wheel, however, a slip control device for suppressing occurrence of slip with which the vehicle travels stably maintaining good road holding even when traveling on a road where a slip is likely to occur.

SUMMARY OF THE INVENTION

The present invention was made in light the background mentioned above, and the object is to provide a slip control device, a slip control method, and a vehicle provided with such a slip control device, with which the vehicle can travel stably even on a slippery road surface maintaining good road holding.

To attain the object, the invention proposes a slip control device of an electric vehicle having a pair of left and right motors for driving a left and right wheels of the vehicle independently, wherein are provided a torque directive control means for calculating torque directives for the motors respectively based on acceleration pedal depressions and steering angles and outputting them to each of motor control sections of the motors, a first reference speed calculation means for calculating first reference speed of one of the pair of left and right motors to be controlled based on rotation speed of the other motor of the pair of motors, and a restriction applying means for determining a permissible speed range for each of the motors by applying prescribed speed deviation to each of the calculated reference speeds and applying restriction to each of the torque directives sent from the torque directive control means based on the permissible speed range determined for each of the motors.

According to the invention, reference speed is calculated by the first reference speed calculation means which calculates reference speed of a motor to be controlled of the pair of motors based on the rotation speed of the other motor of the pair of motors, and further restriction is putted by the restriction applying means by putting permissible speed deviation to the reference speed to obtain a permissible speed range for each of the motor, so speed difference between the speed of a motor of the pair of motors and that of the other motor of the pair of motors is prevented from increasing than the permissible speed range. As a result, separate occurrence of slop or lock of one of the left and right wheels is prevented, and the vehicle can travel stably even on a slippery road surface while keeping good road holding.

It is suitable that the first reference speed calculation means calculates the reference speed of one of the pair of motors by multiplying the speed of the other motor of the pair of motors by a turning factor obtained from torque admeasurement characteristic prescribed for left and right motors in accordance with steering angles.

According to the invention, when calculating first reference speed by the first reference speed calculation means, first reference speed of one of the pair of the motors is calculated from the rotation speed of the other motor of the pair of motors by multiplying a turning factor which is obtained from torque admeasurement for the left and right wheels, so reference speed taking into consideration the rotation speed difference between the inside and outside wheels when the vehicle is turned is calculated and the difference between the motor to be controlled and the other motor of the pair of motors can be prevented from increasing larger than a permissible range. As a result, separate occurrence of slip or lock of one of the left and right wheels is prevented, and the vehicle can travel stably even on a slippery road surface with good road holding.

Further, the control device of the invention is further provided with a second reference speed calculation means for calculating second reference speed of a motor to be controlled in accordance with a steering angle detected by a steering angle detecting means, and a reference speed calculation means for calculating reference speed by applying adoption ratios which determine adoption ratios of the first and second reference speed calculated by the first and second calculation means respectively in accordance with steering angles (hereafter, the invention is referred to as second invention).

According to the second invention, by changing each of the adoption ratios which determine what percentage of the reference speed obtained by the first reference speed calculation means and what percentage of the reference speed obtained by the second reference speed calculation means are to be adopted to calculate reference speed in accordance with steering angles, proper reference speed can be obtained.

The first reference speed calculation means can determine a proper speed range of a motor in consideration of the speed of the other motor of the pair of motors when the vehicle is traveling straight-ahead. However, as steering angles increase, the difference of rotation speed between the left and right wheels increases, proper reference speed cannot be obtained even by correcting the reference speed using the turning factor.

By taking in second reference speed calculated by the second reference speed calculation means and calculating reference speed using prescribed proportion of the first and second reference speeds in accordance with steering angles, reference speed more appropriate to actual conditions can be obtained, occurrence of slip and lock can be prevented effectively including when the vehicle is turned, and the vehicle can travel stably even on a slippery road with good road holding.

Further, by changing continuously the adoption ratios of the first reference speed obtained by the first reference calculation means and that of the second reference speed obtained by the second reference calculation means in accordance with steering angles, occurrence of slip and lock when turning can be prevented without causing shock when switching over reference speed and without deterioration in feeling of driving.

It is suitable in the second invention that reference speed is calculated only by the second speed calculation means when the vehicle takes a short turn with a steering angle larger than a prescribed value.

According to the invention, as reference speed is calculated only by the second speed calculation means when the vehicle takes a short turn, a permissible speed range for a motor of the pair of the motors is determined by a reference speed determined beforehand irrelevant to the speed of the other motor of the pair of the motors. Therefore, occurrence of slip and lock can be effectively prevented and stable of the vehicle can be secured even traveling on a slippery road surface while maintaining good road holding.

Further, in the second invention, it is suitable that the second reference speed calculation means is provided with an operator position correction section for converting its calculation result to a speed corresponding to that of the operator position by dividing the calculation result by a operator position conversion factor in accordance with steering angles.

According to the invention, speed of the operator position is obtained by dividing the reference speed obtained according to the second invention in accordance with steering angles by operator position conversion factors prescribed in accordance with steering angles, and reference speed and a permissible speed range are determined based on the speed of the operator position. Therefore, the permissible speed range can be set nearer to actual feeling of the operator.

Further, in the first invention, it is suitable that reference speed of a motor to be controlled of the pair of motors is calculated based on rotation speed of a non-driven wheel or wheels instead of the other motor of the pair of motors.

According to the invention, even when the left and right drive wheels slip concurrently, reference speed of a motor to be controlled can be calculated based on the rotation speed of the non-driven wheel or wheels, slip control can be performed and highly reliable slip control device can be provided.

The invention proposes as a slip control method of the slip control device a slip control method of an electric vehicle having a pair of left and right motors for driving a left and right wheels of the vehicle independently, wherein torque directives for each of the motors are calculated based on acceleration pedal depressions and steering angles and the torque directives are outputted to each of motor control sections of the motors, reference speed of one of the pair of left and right motors to be controlled is calculated based on rotation speed of the other motor of the pair of motors, and restriction is applied to the torque directives based on a permissible speed range determined by putting prescribed speed deviation to each of the reference speeds.

According to the invention, reference speed is calculated by the first reference speed calculation means which calculates reference speed of a motor to be controlled of the pair of motors based on the rotation speed of the other motor of the pair of motors, and further restriction is putted by putting permissible speed deviation to the reference speed to obtain a permissible speed range for each of the motor, so speed difference between the speed of a motor of the pair of motors and that of the other motor of the pair of motors is prevented from increasing than the permissible speed range. As a result, separate occurrence of slop or lock of one of the left and right wheels is prevented, and the vehicle can travel stably even on a slippery road surface while keeping good road holding.

It is suitable in the invention of method that second reference speed of a motor to be controlled is calculated based on a steering angle detected by a steering angle detecting means, and final reference speed is calculated by using prescribed adoption ratios for allocating said reference speed and reference speed calculated based on said reference speed and the speed of the other motor of the pair of motors in accordance with steering angles.

According to the invention, by changing each of the adoption ratios which determine what percentage of the reference speed obtained by the first reference speed calculation means and what percentage of the reference speed obtained by the second reference speed calculation means are to be adopted to calculate reference speed in accordance with steering angles, proper reference speed can be obtained.

The first reference speed calculation means can determine a proper speed range of a motor in consideration of the speed of the other motor of the pair of motors when the vehicle is traveling straight-ahead. However, as steering angles increase, the difference of rotation speed between the left and right wheels increases, proper reference speed cannot be obtained even by correcting the reference speed using the turning factor.

By taking in second reference speed calculated by the second reference speed calculation means and calculating reference speed using prescribed proportion of the first and second reference speeds in accordance with steering angles, reference speed more appropriate to actual conditions can be obtained, occurrence of slip and lock can be prevented effectively including when the vehicle is turned, and the vehicle can travel stably even on a slippery road with good road holding.

Further, by changing continuously the adoption ratios of the first reference speed obtained by the first reference calculation means and that of the second reference speed obtained by the second reference calculation means in accordance with steering angles, occurrence of slip and lock when turning can be prevented without causing shock when switching over reference speed and without deterioration in feeling of driving.

According to the invention, the vehicle can travel stably even on a slippery road surface while keeping good road holding.

BRIEF DESCRIPTION OF THE DRAWINGS

FIG. 4a shows when straight-ahead driving, and FIG. 4b shows when turning to the right at 50 degrees.

DETAILED DESCRIPTION OF THE INVENTION

Embodiments of the present invention will now be detailed referring accordingly to the accompanying drawings.

Figure 1:
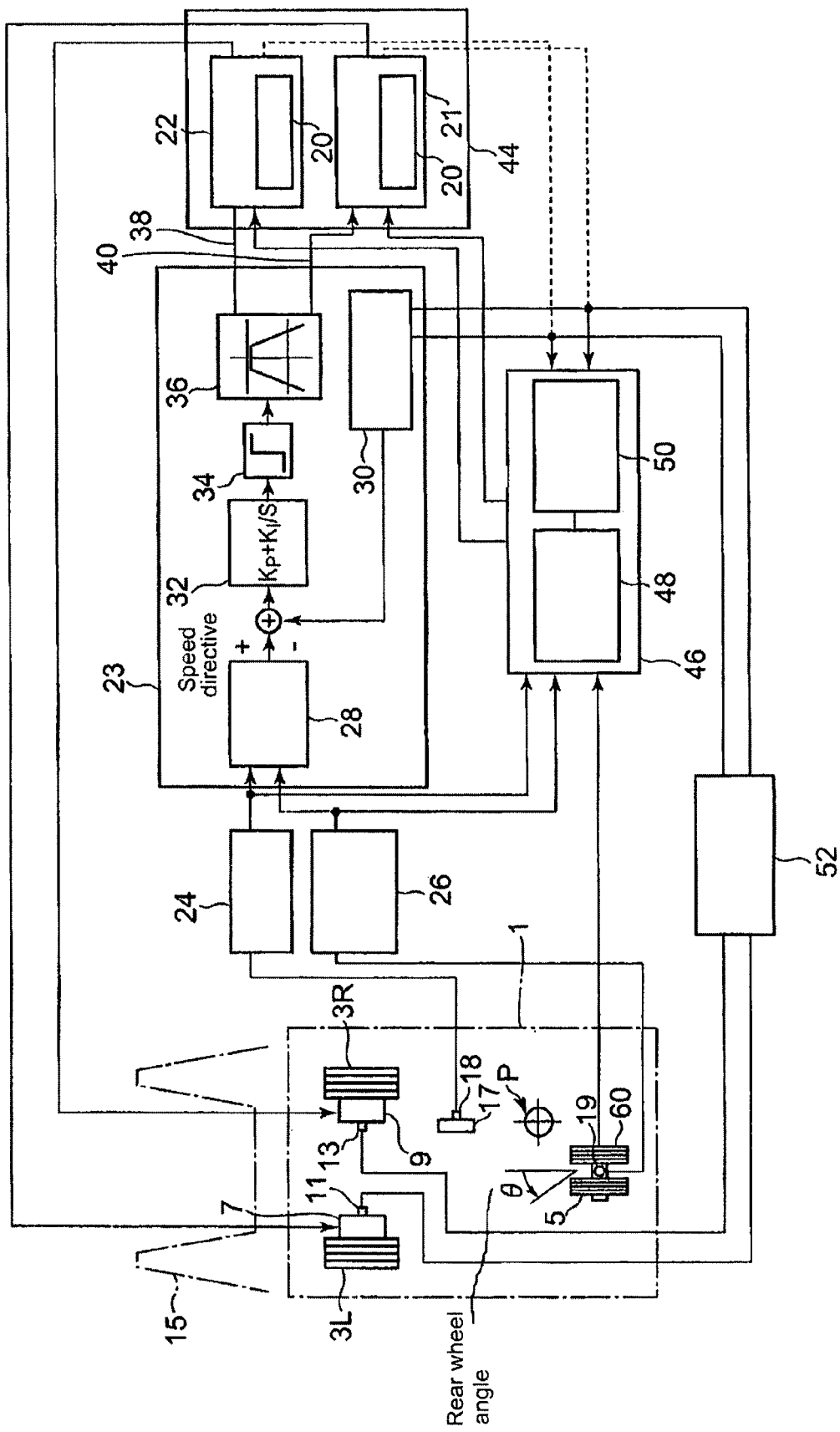
FIG. 1 is a representation of schematic configuration of the electric vehicle and slip control device thereof of the invention.
Figure 2:
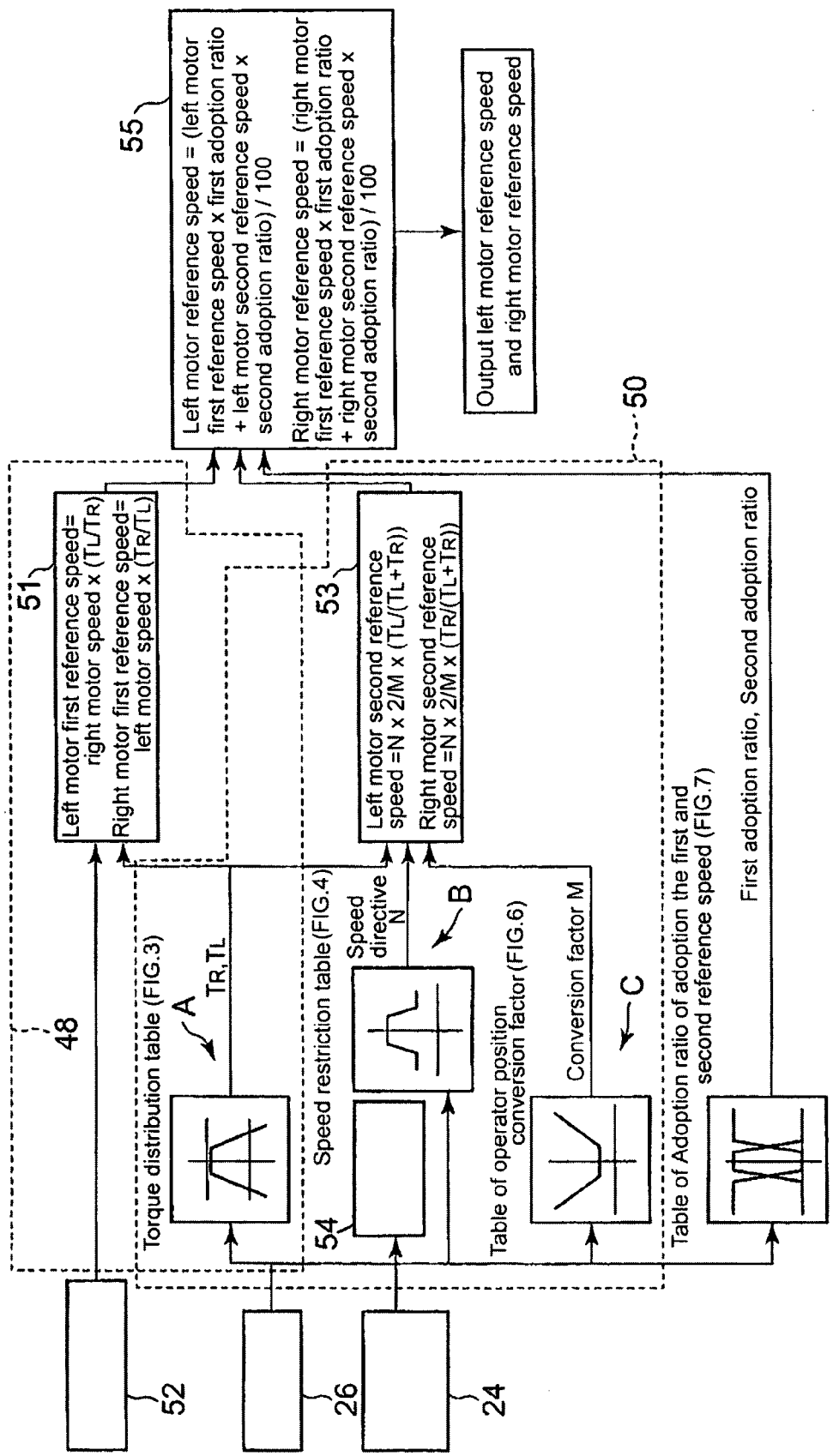
FIG. 2 is a block diagram of the reference speed calculation means in the slip control device.
Figure 3:
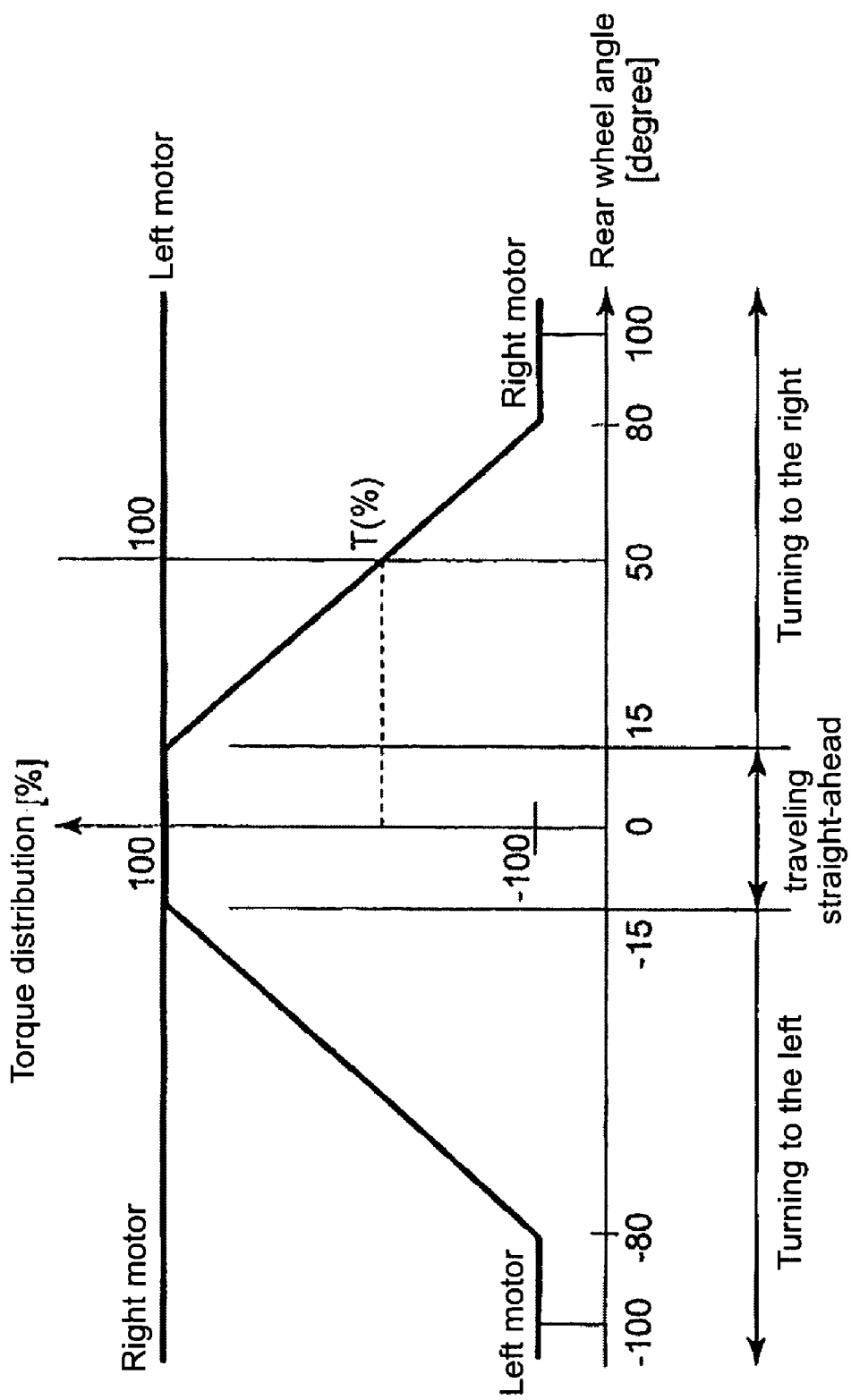
FIG. 3 is a diagram showing torque admeasurement characteristic for left and right wheels.
Figure 4:
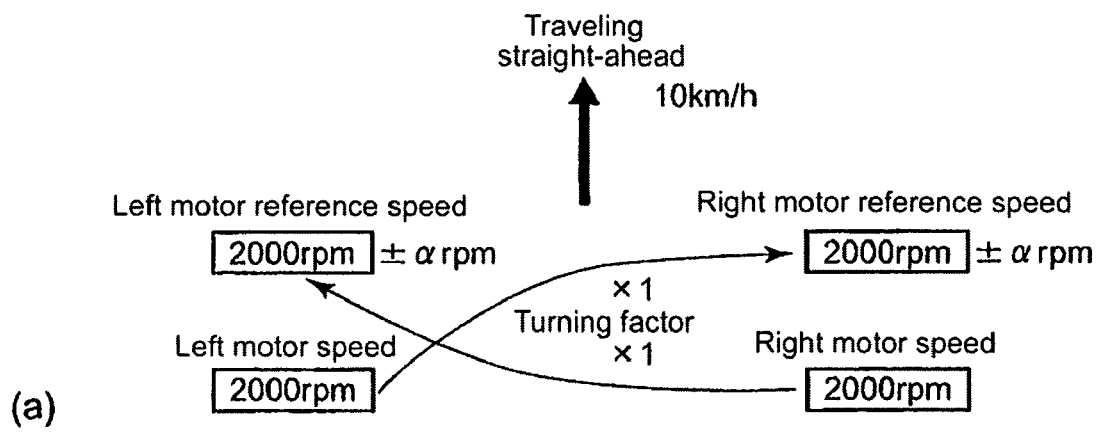
FIG. 4 are drawings for explaining the first reference speed calculation means.
Figure 4:
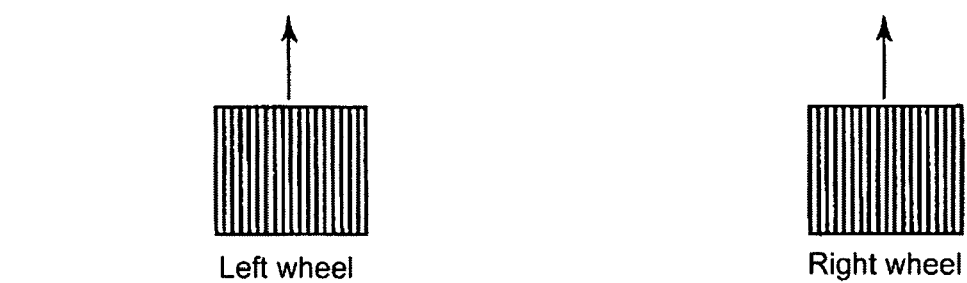
Figure 4:
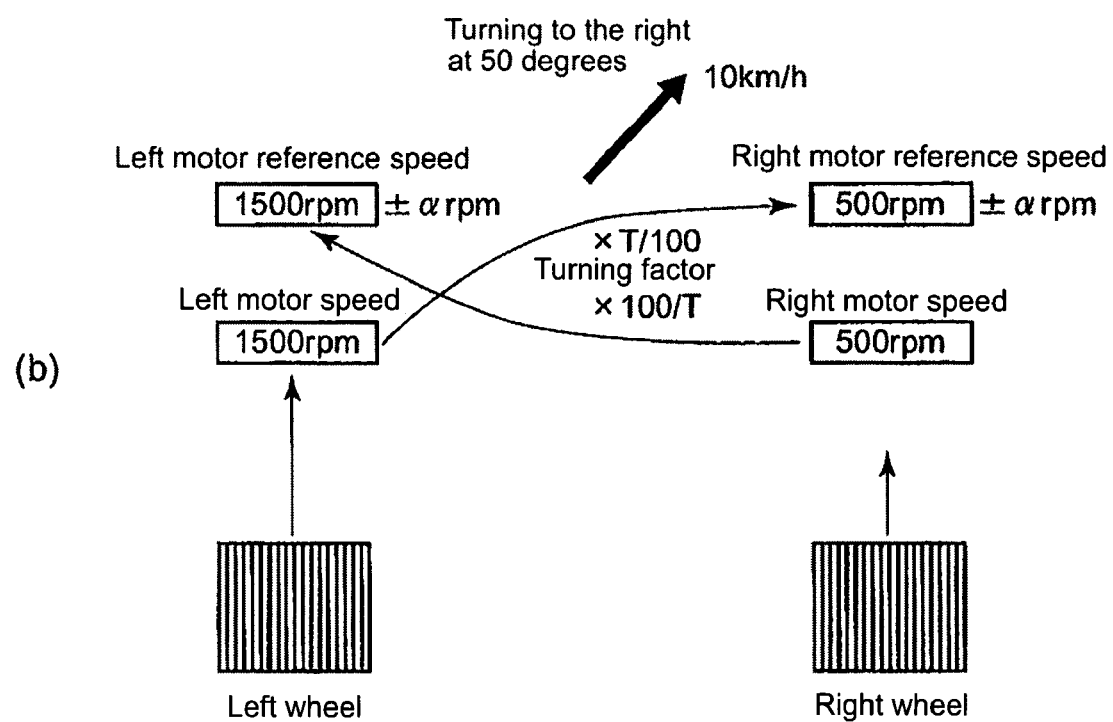
Figure 5:
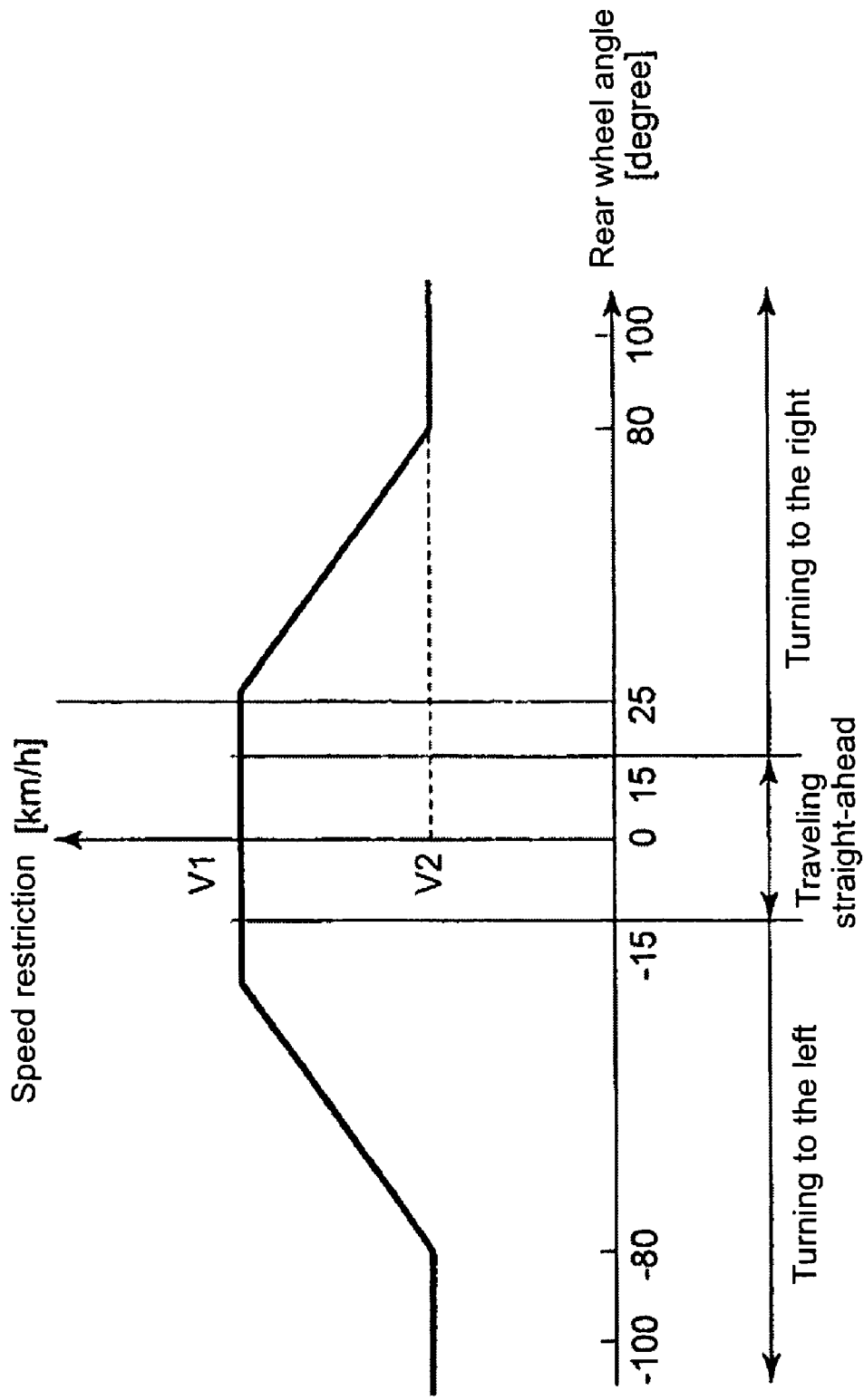
FIG. 5 is a diagram showing characteristic of speed limiter.

FIG. 1 is a representation of schematic configuration of the electric vehicle and slip control device thereof of the invention. FIG. 2 is a block diagram of the reference speed calculation means in the slip control device. FIG. 3 is a diagram showing torque admeasurement characteristic for right and left wheels. FIG. 4 are drawings for explaining the first reference speed calculation means, FIG. 4a shows when straight-ahead driving, and FIG. 4b shows when turning to the right at 50 degrees. FIG. 5 is a diagram showing characteristic of speed limiter. FIG. 6a is a characteristic curve of operator position conversion factor, and FIG. 6b is a drawing for explaining the conversion factor.

Figure 7:
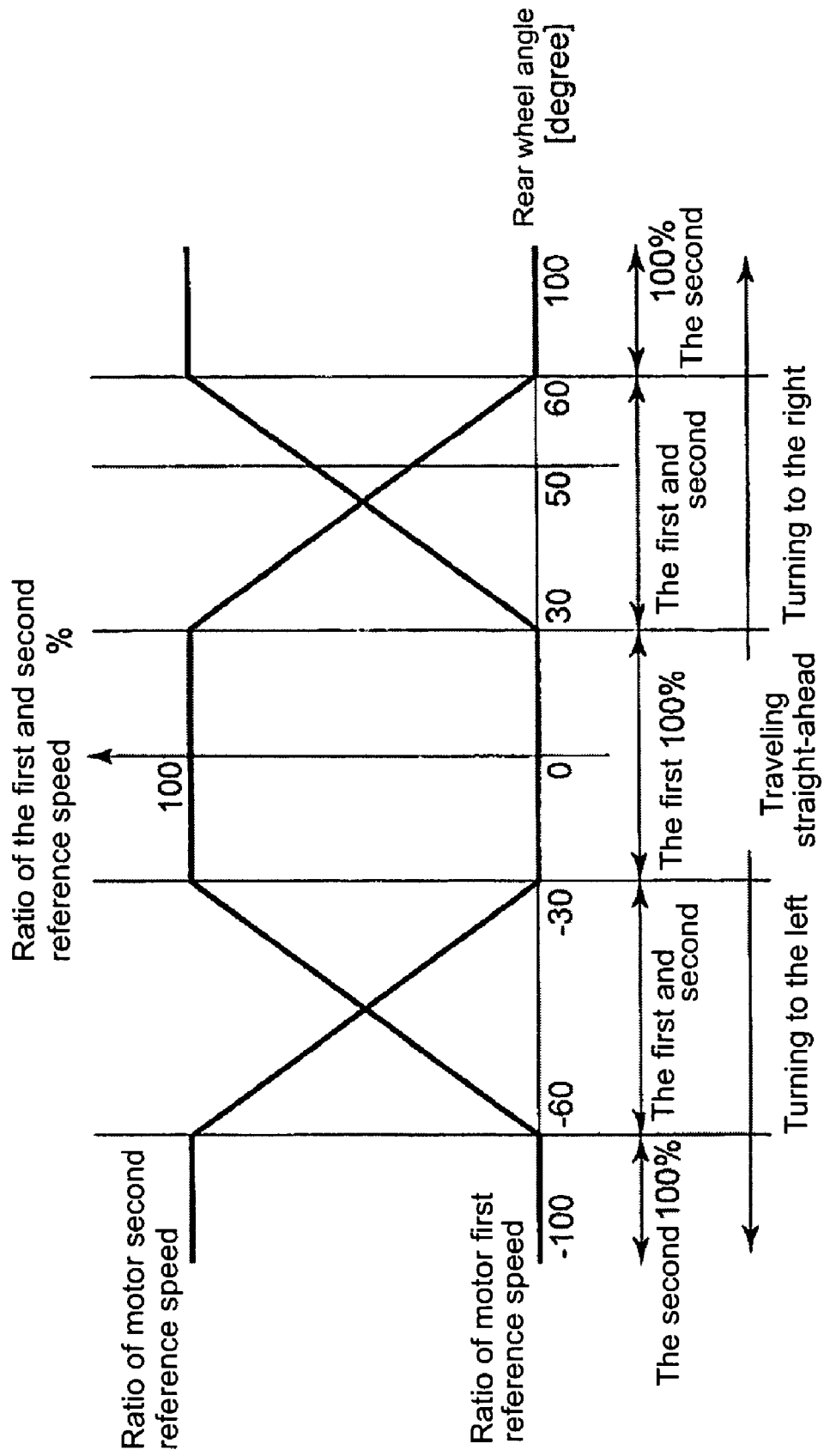
FIG. 7 is a diagram showing adoption ratios of the first and second speed calculation means.
Figure 8:
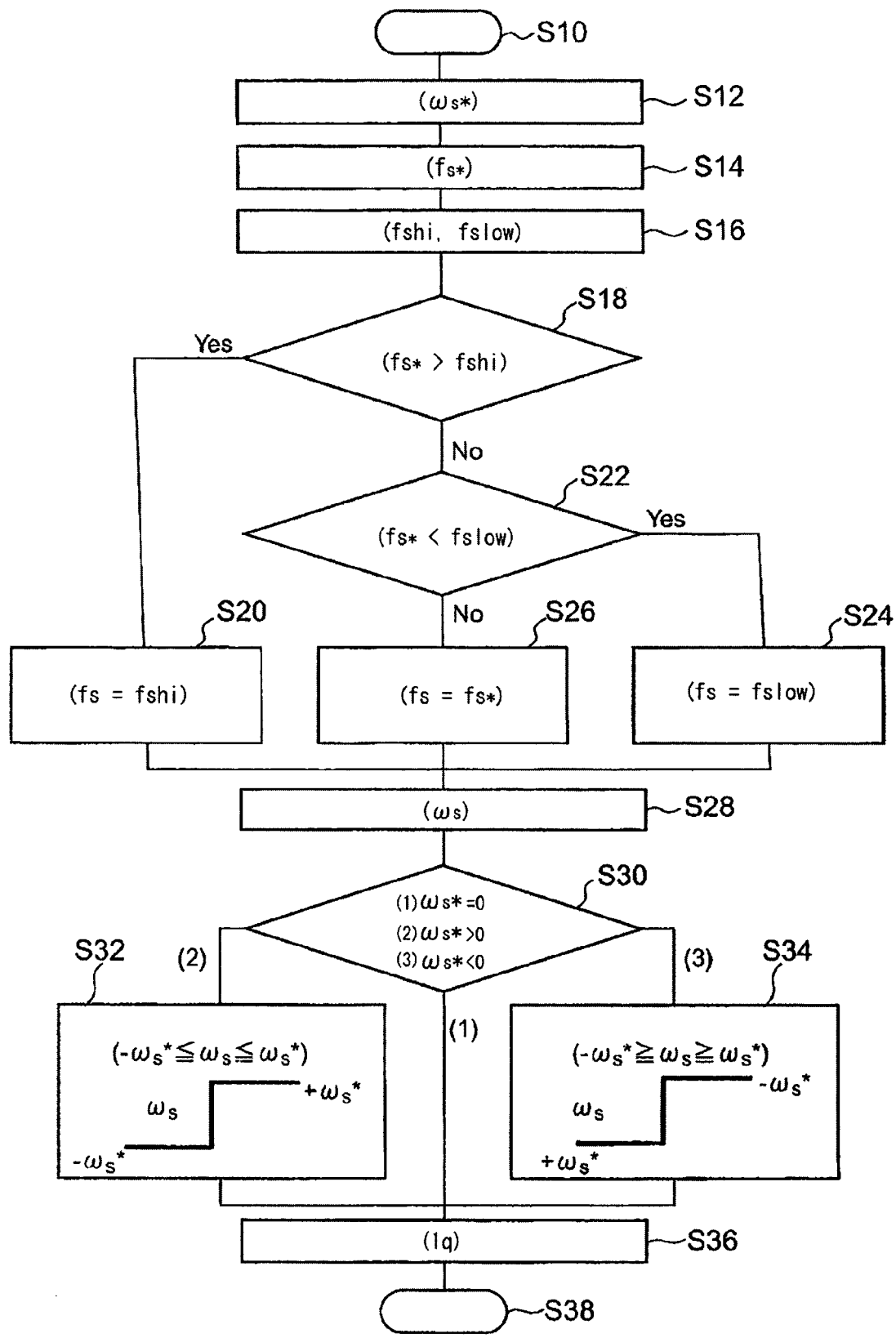
FIG. 8 is a flowchart of process of applying restriction to reference speed by the restriction applying means.

FIG. 7 is a diagram showing adoption ratio of the first and second speed calculation means. FIG. 8 is a flowchart of process of putting restriction to reference speed by restriction putting means.

As shown in FIG. 1, a vehicle body 1 of an electric vehicle of the embodiment is provided with a left side front wheel 3L, a right side front wheel 3R, a rear wheel 5 which is a double tired wheel and located at a center part of width of the vehicle 1. Left and right front wheels 3L and 3R are driving wheels, and electric motors 7 and 9 are attached to each of the front wheels respectively. The electric motors 7, 9 may be in-wheel motors. The electric motors 7, 9 are provided with rotation sensors 11, 13 respectively.

The electric vehicle of the embodiment is an electric forklift truck. A lifter 15 for cargo handling is mounted on the front of the truck to hoist the cargo. A driver stands at a position P. The truck is accelerated by depressing an accelerator pedal 17 and the rear wheel 5 can be turned by an angle θ by manipulating a steering wheel not shown in the drawing. An accelerator pedal depression sensor 18 is attached to the acceleration pedal 17, and a rear wheel angle sensor 19 for detecting a rear wheel angle (steerage angle) is provided to the rear wheel 5.

The left and right motor 7 and 9 are connected to a left and right motor control sections 21 and 22 respectively. Each of the left and right motor control sections is provided with an inverter for the motor and a restriction applying means 20 mentioned later. The left and right control sections 21, 22 control the inverters based on a right torque directive 38 and left torque directive 40 sent out from a torque directive control means 23 mentioned later to supplied required electric current to the motors 7 and 9.

An accelerator pedal depression 24 sent from the acceleration pedal depression sensor 18 and rear wheel angle information sent from the rear wheel angle sensor 19 are inputted to the torque directive control means 23, a speed directive value 28 is obtained from the data memorized beforehand in a map based on the inputted values, feedback control 30 is performed for the calculated speed directive value, then torque distribution 36 is calculated by way of a PI (proportional-integral) controller 32 for controlling rotation speed of the motors and a torque limiter 34, thus a right torque directive 38 and left torque directive 40 are calculated to be outputted to a motor control means 44 consisting of the left and right motor control sections 21 and 22.

Next, a reference speed calculation means 46 for applying restriction to the right torque directive 38 and left torque directive 40 and the restriction applying means 20 will be explained.

The reference speed calculation means 46 consists of a first reference speed calculation means 48 for calculating reference speed of a motor to be controlled based on the rotation speed of the other motor of the pair of left and right motors, and a second reference speed calculation means 50 for calculating reference speed of the motor to be controlled according to the rear wheel angle detected by the rear wheel angle detector 19.

As shown in FIG. 2, the first reference speed calculation means 48 has a first reference speed calculation section 51 which calculates left motor first reference speed and right motor first reference speed by the following equations (1) and (2) by multiplying the rotation speed of the other motor of the pair of the motors by torque distribution, using left and right motor speeds 52 detected by the rotation speed sensors 11, 12 and right and left torque distribution $T_R$%, $T_L$% respectively.

Left motor first reference speed=right motor speed× $(T_L/T_R)$     (1)

$$\text{Right motor first reference speed} = \text{left motor speed} \times (T_R/T_L) \quad (2)$$

First, left and right motor speeds 52 are inputted. These rotation speeds may be detected by the rotation speed sensors 11, 12 or taken in directly from the left and right motor control sections 21, 22. A rear wheel angle detected by the rear wheel angle sensor 19 is inputted. Torque distribution is obtained from the torque distribution characteristics diagram as shown in FIG. 3 based on the detected rear wheel angle to be outputted. In the characteristic diagram of FIG. 3, torque distribution is 100% when the rear wheel angle is θ between about ±15° (near straight-ahead traveling), that is, the rotation speed of the other motor of the pair of the motors is adopted as the first reference speed of the motor to be controlled.

For example, when turning to the right with rear wheel angle θ of +50°, torque distribution is T %, which means that the rotation speed of the right wheel is T % of that of the left wheel. Concretively, the left motor first reference speed is obtained by right motor speed×(100/T), and the right motor first reference speed is obtained by left motor speed×(T/100) from equations (1) and (2).

The value of (100/T) and (T/100) are called turning factors. Reference speed of a motor can be obtained by multiplying the speed of the other motor of the pair of the motor by a corresponding turning factor.

More specific example is shown in FIG. 4. FIG. 4a shows when the forklift truck is traveling straight-ahead at a vehicle speed of 10 Km/h and left and right motor speed are 2000 RPM respectively. Left and right first reference speeds are as written in FIG. 4a. FIG. 4b shows that when the truck is turned to the right by turning the rear wheel θ to 50° while traveling at 10 Km/h, the left motor speed becomes 1500 RPM and right motor speed becomes 500 RPM. That the reference speeds include ±a RPM is to represents permissible speed range determined in the restriction putting means 20 explained later.

In the above explanation, rotation speeds of the left and right motors 7 and 9 are used as reference speed respectively, rotation speed detected by the rotation speed sensor 60 of the rear wheel 5 which is non-drive wheel may be used as reference speed. In this case, even when the left and right wheels 3L and 3R, which are drive wheels, slip or lock, reference rotation speed of a motor to be controlled can be calculated based on the rotation speed of the rear wheel 5, so suppression of occurrence of slips of the front wheels 3L, 3R can be performed positively and a highly reliable control device can be provided.

Next, as shown in FIG. 2, the second reference speed calculation means 50 has a torque distributing section A for allocating right torque $T_R$ % and left torque $T_L$ %, a speed directing section B for applying speed restriction to the speed directive value, an operator position correction section C for converting the motor speeds to a speed at operator position using the operator position conversion factor M, and a second reference speed calculation section 53 for obtaining left motor second reference speed and right motor second reference speed from the following equations (3) and (4). In the following equations, as speed directive value N obtained as mentioned later is the average speed of the left and right motors, it is multiplied by 2 when obtaining the second reference speed.

$$\text{Left motor second reference speed} = (N \times 2)/M \times (T_L/(T_L + T_R)) \quad (3)$$

$$\text{Right motor second reference speed} = (N \times 2)/M \times (T_R/(T_L + T_R)) \quad (4)$$

The rear wheel angle 26 detected by the rear wheel angle sensor 19 is inputted, torque distribution is obtained from the torque distribution characteristic of FIG. 3, further speed directive calculation 54 is performed using the accelerator pedal depression 24 detected by the accerlerator pedal depression sensor 18 based on the relation between acceleration pedal depression and speed directive value prescribed in a diagram or table, and the speed directive N obtained by multiplying the calculated speed directive by the speed limiter shown in FIG. 5 is outputted.

As can be seen in the speed limiter characteristic of FIG. 5, the value of speed limiter decreases with increased steering angles owing to increase of centrifugal effect. For example, as shown in FIG. 5, the speed limiter is established such that, when traveling straight-ahead, the speed limiter value is V1 (Km/h), it decreases linearly with increased rear wheel angles to reach V2 (Km/h) which is about half of V1 when the rear wheel is turned to about 80°.

As shown in FIG. 6a, the operator position conversion factor M has such a characteristic that operator position conversion factor is M1 when the truck is traveling straight-ahead, it increases with increased rear wheel angles to reach M1 at rear wheel angles of 50°, then increases to reach maximum value M2.

When the truck is traveling straight-ahead, the average value of the left and right motor speeds are equal to the speed of the operator position (the position the driver stands on the truck). That is, as shown in FIG. 6b, axes of rotation Q, Q' are at infinity, so the speeds of the left and right motors are equal to the speed of the operator position.

When the truck is turned, distance R1 from the axis of rotation Q to the center C between the left and right motors is different from distance R2 from the axis of rotation Q to position P of the operator, and further, as rear wheel angle θ increases the axis of rotation Q comes near to the vehicle body, so in order to obtain speed of the operator position when the vehicle is turning it is necessary to make corrections to the average of the left and right motor speeds in consideration of centrifugal effect due to turning of the vehicle. This correction factor is the operator position conversion factor M, which is memorized beforehand in a diagram or table as factors corresponding to rear wheel angles.

The operator position conversion factor M has such a meaning that when the vehicle is turning with a rear wheel angle of 50° as shown in FIG. 6a, the speed of the operator position P is M1 times the speed of the vehicle when traveling straight-ahead. That is, when the vehicle turns to the right with a rear wheel angle of at 50°, the speed of the operator position is Vh×M1, where Vh is an average of left and right motor speeds. Therefore, the operator performs cargo handling operation while feeling speed higher than the actual motor speed.

Therefore, the second reference speeds are obtained by dividing by the operator position factor M as shown in equations (3) and (4) in order to correspond to actual feeling of the operator.

Next, final reference speed is calculated in a reference speed calculation section 55 by the following equations (5) and (6) taking into consideration adoption ratio of the first reference speed and second reference speed obtained as mentioned above.

$$\text{Left motor reference speed} = (\text{left motor first reference speed} \times \text{first adoption ratio} + \text{left motor second reference speed} \times \text{second adoption ratio})/100 \quad (5)$$

$$\text{Right motor reference speed} = (\text{right motor first reference speed} \times \text{first adoption ratio} + \text{right motor second reference speed} \times \text{second adoption ratio})/100 \quad (6)$$

Adoption ratio of adopting the first reference speed (first adoption ratio) and adoption ratio of adopting the second reference speed (second adoption ratio) are shown in FIG. 7. As shown in FIG. 7, when the vehicle is traveling straight-ahead, the first adoption ratio is 100% and the second adoption ratio is 0%. As the rear wheel angle increases, the second adoption ratio increases continuously and the first adoption ratio decreases continuously. In a range of sharp turn of the vehicle when the rear wheel angle exceeds ±60°, the first adoption ratio is zero and the second adoption ratio is 100%.

The final reference speeds in consideration of the adoption ratios of the first and second reference speed are outputted to the motor control means 44.

Next, the restriction applying means 20 for applying restriction to the torque directive by adding a permissible speed deviation to the reference speed calculated by the reference speed calculation means 46 to obtain a permissible speed range will be explained.

The restriction applying means 20 is provided to each of the left and right motor control sections 21 and 22. FIG. 8 shows the flowchart in the restriction applying means 20.

Referring to FIG. 8, the process begins from step S10. Slip velocity $\omega s^*$ of an induction motor to be outputted to allow the induction motor to develop torque in accordance with a torque directive is calculated in step S12. That is, based on the right torque directive 38 and left torque directive 40, slip velocity $\omega s^*$ and current directive $Iq^*$ to be sent to the motor 7 or 9 for the motor to develop torque in accordance with the torque directive are calculated. Then, frequency fs* (first order frequency) to be outputted is calculated by the following equation (7) in step S14.

$$fs^* = \omega m (\text{motor rotation speed}) + \omega s^* \quad (7)$$

Next, upper and lower limiters of frequency are calculated in step 16. Upper frequency limiter fshi and lower frequency limiter fslow are determined by adding ±fr which is a frequency value obtained by converting a prescribed permissible speed (±αRPM) to a frequency value fb obtained by converting the reference speed calculated by the reference speed calculation means 46, as expressed in the following equations (8) and (9).

$$fshi = fb + fr \quad (8)$$

$$fslow = fb - fr \quad (9)$$

Then, whether the frequency fs* to be outputted is larger than the upper frequency limiter fshi is judged in step S18, when judged larger, go to step 20 to set output frequency fs to the upper frequency limiter fshi.

When the frequency fs* to be outputted is judged to be not larger than the upper frequency limiter fshi, go to step S22 and whether the frequency fs* is smaller than the lower frequency limiter fslow is judged. When judged smaller, go to step 24 to set output frequency fs to the lower frequency limiter fslow. When the frequency fs* is judged to be not smaller than the lower frequency limiter fslow, go to step 26 to set output frequency fs to the frequency fs* to be outputted.

Then, output slip $\omega s$ is re-calculated in step S28 by the following equation (10).

$$\omega s = fs - \omega m (\text{motor rotation speed}) \quad (10)$$

Then, restriction is putted to the calculated output slip $\omega s$ in steps S30, S32, and S34.

In step S30, if the slip $\omega s^*$ to be outputted is 0, or >0, or <0 is judged. When $\omega s^* = 0$, go to step 36 without applying restriction to $\omega s$ and current directive Iq is re-calculated by the following equation (11). When $\omega s^* > 0$, go to step 32 where restriction is applied to $\omega s$ so that $-\omega s^* \leq \omega s \leq \omega s^*$, and then go to step S36. When $\omega s^* < 0$, go to step 34 where restriction is applied to $\omega s$ so that $-\omega s^* \geq \omega s \geq \omega s^*$, and then go to step S36.

$$Iq = Iq^* \times (\omega s / \omega s^*) \quad (11)$$

By sending the recalculated current directive Iq to the motors 7, 9, the rotation speeds of the motors 7, 9 can be controlled in a range of rotation speed defined by adding permissible deviations to the calculated reference speed respectively.

According to the embodiment, the first reference speed of a motor of the pair of the motors is calculated based on the rotation speed of the other motor of the pair of motors by the first reference speed calculation means 48, then restriction is putted to the first reference speed by adding a permissible speed deviation in the restriction putting means 20, so speed difference between the speed of a motor of the pair of motors and that of the other motor of the pair of motors is prevented from increasing than the permissible speed range. As a result, separate occurrence of slop or lock of one of the left and right wheels is prevented, and the vehicle can travel stably even on a slippery road surface with good road holding.

Further, according to the embodiment, when calculating first reference speed by the first reference speed calculation means 48, the first reference speed of one of the pair of the motors is calculated from the rotation speed of the other motor of the pair of motors by multiplying a turning factor which is obtained from torque admeasurement as shown in FIG. 3 (right torque admeasurement $T_R$ % and left torque admeasurement $T_L$ %), reference speed is calculated taking into consideration the speed difference between the inside and outside wheels when the vehicle is turned, so the difference between the motor to be controlled and the other motor of the pair of motors can be prevented from increasing larger than a permissible range. As a result, separate occurrence of slip or lock of one of the left and right wheels is prevented, and the vehicle can travel stably even on a slippery road surface with good road holding.

Further, according to the embodiment, by changing the ratio of adopting reference speed obtained by the first reference speed calculation means 48 and that obtained by the second reference speed calculation means 50 depending on rear wheel angle θ as shown in FIG. 7, calculation of proper reference speed can be possible in accordance with the rear wheel angle.

The first reference speed calculation means 48 can determine a proper speed range of a motor in consideration of the speed of the other motor of the pair of motors when the vehicle is traveling straight-ahead. However, as steering angles increase, the difference of rotation speed between the left and right wheels increases, proper reference speed can not be obtained even by correcting the reference speed using the turning factor.

By taking in second reference speed calculated by the second reference speed calculation means 50 and calculating reference speed using prescribed proportion of the first and second reference speeds in accordance with steering angles, reference speed more appropriate to actual conditions can be obtained, occurrence of slip and lock can be prevented effectively including when the vehicle is turned, and the vehicle can travel stably even on a slippery road with good road holding.

Further, as adoption ratios of the first reference speed obtained by the first reference calculation means 48 and that of the second reference speed obtained by the second reference calculation means 50 are changed continuously depending on the rear wheel angles as shown in FIG. 7, occurrence of slip and lock when the vehicle turns can be prevented without causing shock which may occurs when switching over reference speed and without deterioration in feeling of driving.

Figure 6:
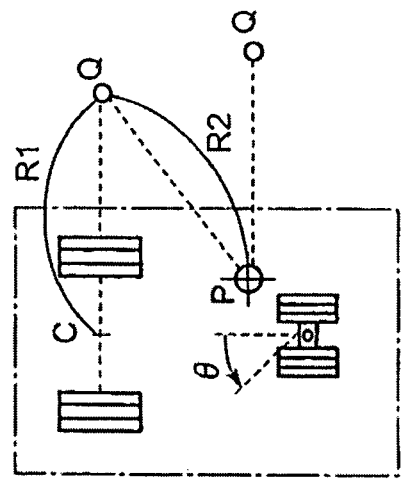
FIG. 6a is a characteristic curve of operator position conversion factor.
FIG. 6b is a drawing for explaining the conversion factor.
Figure 6:
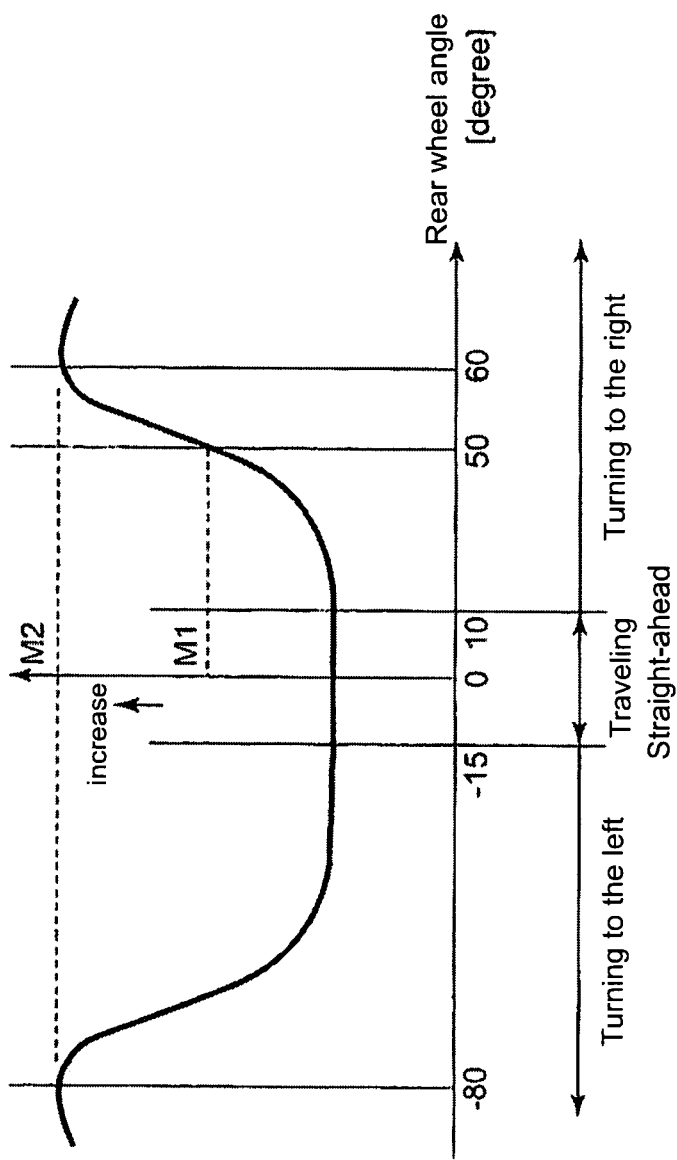

Further, when calculating the second reference speed by the second reference speed calculation means 50, the second reference speed is obtained by dividing speed directive N by operator position conversion factor M shown in FIG. 6 to obtain speed of the operator position, and the permissible speed range is determined based on the speed, so the permissible speed range can be set nearer to actual feeling of the operator.

As occurrence of slip and lock can be prevented by determining reference speed and restriction is applied to the current directive sent to the motors based on the reference speed by means of the restriction applying means without providing a control device for judging occurrence of slip and lock, the control device of the invention can be simplified in construction.

In the embodiment, explanation has been made on an example of three-wheeled electric forklift truck, however, it is a matter of coarse that the invention can be applied a four-wheeled electric forklift truck with two driving wheels. In this case, by establishing operator position conversion factor for four-wheeled truck, the similar action and effect can be attained.

According to the invention, an electric vehicle having a pair of right and left wheels driven independently by an electric motor respectively and provided with a slip control device for suppressing occurrence of slip of driving wheels which enables stable traveling even on a slippery road surface with good road holding, can be provided.

According to the electric vehicle, the slip control device, and the control method thereof according to the invention, an electric vehicle provided with a slip control device with which stable operation of the vehicle is secured even on a slippery road surface while maintaining good road holding, can be provided, and the invention can be applied with advantage to a vehicle having a pair of right and left wheels driven independently by an electric motor respectively.

The invention claimed is:

1. A slip control device of an electric vehicle having a pair of left and right motors for driving a left and right wheels of the vehicle independently, comprising:
    torque directive control means for calculating torque directives for the motors respectively based on accelerator pedal depressions and steering angles and outputting the calculated torque directives to each of motor control sections of the motors;
    first reference speed calculation means for calculating a first reference speed of one of the pair of left and right motors to be controlled based on rotation speed of the other motor of the pair of motors; and
    restriction applying means for determining a permissible speed range for each of the motors by applying prescribed speed deviation to each of the calculated reference speeds and applying restriction to each of the torque directives sent from the torque directive control means based on the permissible speed range determined for each of the motors,
    wherein said first reference speed calculation means calculates said first reference speed of one of the pair of motors by multiplying the speed of the other motor of the pair of motors by a turning factor obtained from torque admeasurements characteristic prescribed for left and right motors in accordance with steering angles.

2. A slip control device according to claim 1, further comprising:
    second reference speed calculation means for calculating second reference speed of a motor to be controlled in accordance with a steering angle detected by a steering angle detecting means; and
    reference speed calculation means for calculating reference speed by applying adoption ratios which determine adoption ratios of the first and second reference speed calculated by the first and second calculation means respectively in accordance with steering angles.

3. A slip control device according to claim 2, wherein the reference speed is calculated only by the second speed calculation means when the vehicle takes a short turn with a steering angle larger than a prescribed value.

4. An electric vehicle, comprising:
    the slip control device according to claim 3.

5. A slip control device according to claim 2, wherein said second reference speed calculation means is provided with an operator position correction section for converting its calculation result to a speed corresponding to that of the operator position by dividing the calculation result by an operator position conversion factor in accordance with steering angles.

6. An electric vehicle, comprising:
    the slip control device according to claim 5.

7. An electric vehicle, comprising:
    the slip control device according to claim 2.

8. A slip control device according to claim 1, wherein the wherein reference speed of a motor to be controlled of the pair of motors is calculated based on rotation speed of a non-driven wheel or wheels instead of the speed of the other motor of the pair of motors.

9. An electric vehicle, comprising:
    the slip control device according to claim 8.

10. An electric vehicle, comprising:
    the slip control device according to claim 1.

11. A slip control device according to claim 10, wherein the electric vehicle further comprises:
    electric motors provided to right and left front wheels of the vehicle, respectively, for driving the left and right front wheels independently,
    wherein the electric vehicle is configured to be turned by steering a rear wheel located at a center part in a widthwise direction of the vehicle.

12. A slip control device according to claim 1, wherein the electric vehicle further comprises:
    electric motors provided to right and left front wheels of the vehicle, respectively, for driving the left and right front wheels independently,
    wherein the electric vehicle is configured to be turned by steering a rear wheel located at a center part in a widthwise direction of the vehicle.

13. A slip control method of an electric vehicle having a pair of left and right motors for driving a left and right wheels of the vehicle independently, comprising:
    calculating torque directives for each of the motors based on accelerator pedal depressions and steering angles and outputting the torque directives to each of motor control sections of the motors; and
    applying restriction to the torque directives based on a permissible speed range determined by applying prescribed speed deviation to each of the reference speeds,
    wherein a second reference speed of a motor to be controlled is calculated based on a steering angle detected by a steering angle detecting means, and
    a final reference speed is calculated by using prescribed adoption ratios for allocating said second reference speed and a first reference speed calculated based on said second reference speed and the speed of the other motor of the pair of motors in accordance with steering angles.

14. An electric vehicle, comprising:
the slip control device according to claim 13.

15. A slip control device of an electric vehicle having electric motors provided to right and left front wheels of the vehicle, respectively, for driving the left and right front wheels independently, and being configured to be turned by steering a rear wheel located at a center part in a width-wise direction of the vehicle, comprising:

torque directive control means for calculating torque directives for the right and left front wheels for the motors, respectively, based on accelerator pedal depressions and steering angles of said rear wheel and outputting the calculated torque directives to each of motor control sections of the motors; and reference speed calculation means for calculating a reference speed of one of the pair of left and right motors of the right and left front wheels to be controlled based on rotation speed of the other motor of the pair of motors; and restriction applying means for determining a permissible speed range for each of the motors by applying prescribed speed deviation to each of the calculated reference speeds and applying restriction to each of the torque directives sent from the torque directive control means based on the permissible speed range determined for each of the motors, wherein said reference speed calculation means calculates said reference speed of one of the pair of motors by multiplying the speed of the other motor of the pair of motors by a turning factor obtained from torque admeasurements characteristic prescribed for left and right motors in accordance with steering angles.

16. A slip control method of an electric vehicle having electric motors provided to right and left front wheels of the vehicle, respectively, for driving the left and right front wheels independently, and being configured to be turned by steering a rear wheel located at a center part in a width-wise direction of the vehicle, comprising:

calculating directives for each of the motors based on accelerator pedal depressions and steering angles of said rear wheel and outputting the torque directives to each motor control sections of the motors; and applying restriction to the torque directives based on a permissible speed range determined by applying prescribed speed deviation to each of the reference speeds, wherein a second reference speed of a motor to be controlled is calculated based on a steering angle detected by a steering angle detecting means, and a final reference speed is calculated by using prescribed adoption ratios for allocating said reference speed and reference speed calculated based on said reference speed and the speed of the other motor of the pair of motors in accordance with steering angles.

* * * * *